Aug. 7, 1928.

W. DITSCH ET AL 1,679,856

DUSTLESS ASH CONTAINER

Filed Jan. 28, 1926

Walter Ditsch
Frank O. Davis
Inventors

By H. S. Amstutz
Attorney

Patented Aug. 7, 1928.

1,679,856

UNITED STATES PATENT OFFICE.

WALTER DITSCH AND FRANK O. DAVIS, OF MISHAWAKA, INDIANA.

DUSTLESS ASH CONTAINER.

Application filed January 28, 1926. Serial No. 84,324.

Our invention relates to improvements in dustless ash containers, and it more especially consists of the features pointed out in the annexed claim.

The purpose of our invention is to provide a receptacle for ashes which prevents the escape of dust as the ash is shoveled from furnaces, boilers etc., into a container for storage until a sufficient quantity has accumulated to be removed from the basement; that especially prevents the spread of dust, when ashes are put into the container, by means of a vent from above the container into the chimney flue; that where floor or wall registers are used our device avoids the unpleasant task of continuous dusting of furniture, etc., which is a constant source of annoyance, besides damaging decorations, floor coverings etc.; that facilitates the removal of ashes from below the grates at stated times preventing the accumulation of ashes and the risk of burned out grate bars; that serves to keep a basement and attendant clean; and finally by reason of dust elimination avoids respiratory illnesses of one kind or another.

With these and other ends in view, we illustrate in the accompanying drawing such instances of adaptation as will disclose the broad underlying features without limiting ourselves to the specific details shown thereon and described herein.

In practically carrying out our invention we may use any desired form of sheet metal casing 1 which has flanged feet 5, by means of which it may be secured to a basement floor 6 in any desired manner so as to remain fixed in a given position. While we show the casing without a bottom it is to be understood that if required for any reason, we may place a sheet metal bottom in the casing.

Figure 4:
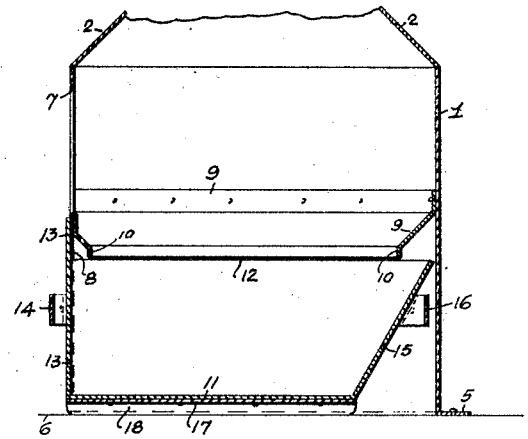
Figure 4 is a side elevation in section of Figure 1.

The casing has a front opening 8 through which the ash container slides, and a second opening 7 located above the opening 8, through which the ashes are thrown from a shovel 19. The ash pan or container has a flanged front 13 to which a handle 14 is fastened. To this front a bottom 11 and sides 12 are secured. The sides 12 at the rear end are joined by a beveled end 15 to which a handle 16 is attached. This beveled end 15 makes it easier to throw the ashes out of the pan. The pan may have its bottom 11 reinforced by a plate 17 which has its side edges 18 bent downward to form stiffening flanges. These have their ends rounded, as shown in Figure 4, so as to make it easy to remove and replace the ash container.

Figure 1:
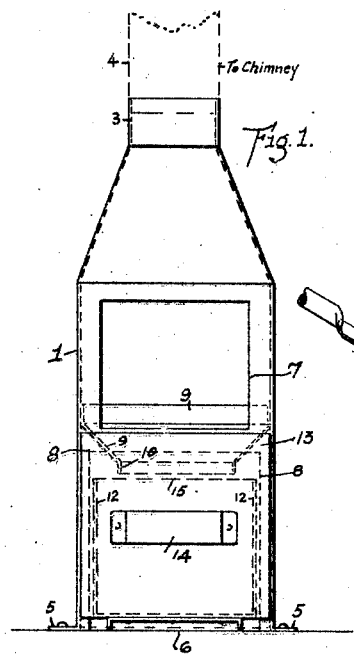
Figure 1 is a front elevation.
Figure 2:
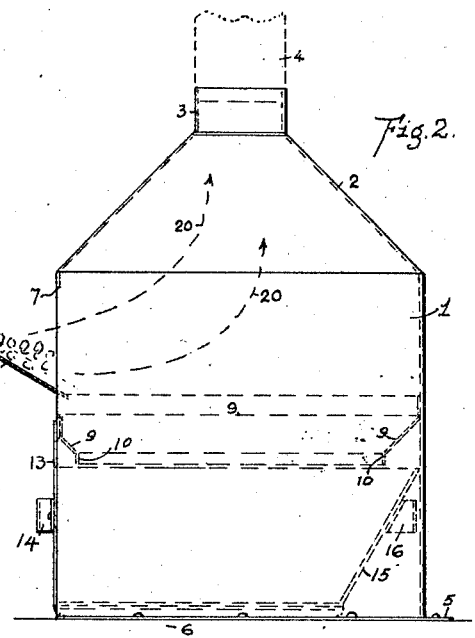
Figure 2 is a side elevation of Figure 1.
Figure 3:
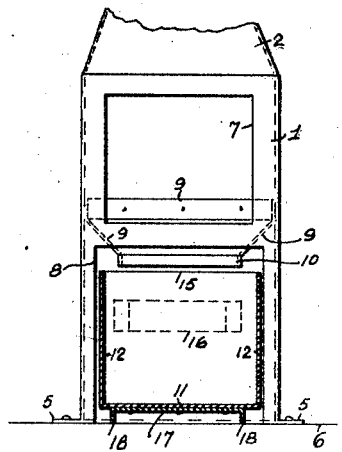
Figure 3 is a front elevation with the ash pan or container in section.

Above the ash pan or container, a beveled hopper-like projection 9 is secured to the casing 1 on its four inner surfaces. The beveled portion 9 has an apron extension 10. These parts serve to direct the ashes as they are thrown through the opening 7 into the ash pan. At the same time the dust from the ashes is carried upward, as indicated by the arrows 20, through the contracted hood 2 into the delivery pipe 3 which is connected by a pipe 4, to the chimney, shown in dotted lines in Figures 1 and 2.

We do not limit ourselves to the exact shape of our device in its various constructive features, as these may be varied without departing from the spirit of our invention. Our dustless container may be located on either the right or left hand side of a furnace, wherever is found most convenient, so that the vent pipe leading to the chimney is made in as direct a line as possible. The casing, as already stated, is secured to the floor so that it will not be accidentally moved out of place, which if allowed would be liable to disconnect the vent pipe to the chimney. It is of course understood that the opening to receive the ashes is made large enough to freely accommodate a shovel without running any risk of spilling any ashes on the floor.

What we claim is:

In dustless ash containers, a rectangular casing having a hood, a vent pipe attached to the hood, said casing having an ash receiving opening located above an ash pan opening formed in one end of the casing, a hopper attached to and extending all around on the inside of the casing positioned between the two openings combined with a removable ash pan provided with a sloping rear end, a flanged front end adapted to cover the lower opening of the casing, and an extra reinforcing plate attached to the bottom of the pan said plate having depending flanged edges.

In testimony whereof we affix our signatures.

WALTER DITSCH.
FRANK O. DAVIS.